(12) United States Patent
Baldemair et al.

(10) Patent No.: US 8,611,262 B2
(45) Date of Patent: *Dec. 17, 2013

(54) METHODS AND DEVICES FOR RANDOM ACCESS POWER CONTROL IN A COMMUNICATIONS NETWORK

(75) Inventors: Robert Baldemair, Solna (SE); Anders Furuskar, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/488,051

(22) Filed: Jun. 4, 2012

(65) Prior Publication Data

US 2012/0302278 A1 Nov. 29, 2012

Related U.S. Application Data

(63) Continuation of application No. 12/747,028, filed as application No. PCT/SE2008/051142 on Oct. 7, 2008, now Pat. No. 8,194,575.

(60) Provisional application No. 61/020,493, filed on Jan. 11, 2008.

(51) Int. Cl.
*H04B 7/005* (2006.01)
*H04W 4/00* (2009.01)

(52) U.S. Cl.
USPC ............ 370/278; 370/329; 455/450; 455/522

(58) Field of Classification Search
USPC ......... 370/311, 328, 329, 332, 252, 278, 282; 375/295–297, 316–319; 455/13.4, 24, 455/67.11, 67.16, 69, 114.2, 114.3, 455/115.1–115.3, 226.1, 270, 271, 343.5, 455/411, 436, 522, 450–452.2
See application file for complete search history.

(56) References Cited

U.S. PATENT DOCUMENTS 6,249,683 B1 6/2001 Lundby et al.
2010/0265900 A1 10/2010 Baldemair et al.

OTHER PUBLICATIONS

Interdigital Communications: "Uplink power control procedures and Text Proposal for E-UTRA". 3GPP TSG RAN WG1 Meeting #50bis. R1-074388. Oct. 8-12, 2007. Shanghai, China.
Motorola: "Remaining Issues on UL PC". 3GPP TSG RAN1#51bis. R1-080097. Jan. 14-18, 2008. Sevilla, Spain.

*Primary Examiner* — Habte Mered

(57) ABSTRACT

A method for determining a random access transmission power setting of a first communication device in a communications network includes receiving, at a first communication device, data from a second communication device indicating a random access reception power. The method also includes determining a desired random access reception power of the second communication device based on the received data and a parameter of random access configuration that influences a detection performance of the random access at the second communication device and determining a random access transmission power to use based on the desired random access reception power. The method additionally includes setting a random access transmission power setting of the first communication device in accordance with the determined random access transmission power.

16 Claims, 5 Drawing Sheets

METHODS AND DEVICES FOR RANDOM ACCESS POWER CONTROL IN A COMMUNICATIONS NETWORK

CLAIMING BENEFIT OF PRIOR FILED U.S. APPLICATION

This application is a continuation of International Application PCT/SE2008/051142, with an international filing date of Oct. 7, 2008, which corresponds to the national-stage entry U.S. patent application Ser. No. 12/747,028, filed Oct. 7, 2008, and which claims the benefit of U.S. Provisional Application No. 61/020,493 filed Jan. 11, 2008, and the contents of all of the preceding are hereby incorporated by reference herein.

TECHNICAL FIELD

The invention relates to methods and devices in a communications network, in particular, for designing a random access transmission power setting of a communication device.

BACKGROUND

In modern cellular radio systems, a radio network has a strict control on the behavior of a user equipment, UE. Uplink transmission parameters like frequency, timing, and power are regulated via downlink DL control signaling from the base station to the UE.

At power-on or after a long standby time, the UE is not synchronized in the uplink. A first step in accessing the network is therefore to obtain synchronization to the network. This is usually done by the UE by listing to downlink signals and obtain from this signals downlink timing synchronization, an estimate of the frequency error, and also an estimate of the DL path loss. Even though the UE is now time-synchronized to the DL, signals transmitted by the UE are still not aligned with the desired reception timing at the base station due to an unknown round trip timing. Therefore, before commencing traffic, the UE has to carry out a Random Access (RA) procedure to the network. After the RA, eNodeB can estimate the timing misalignment of the UE uplink and send a correction message. The random access procedure may also be used by synchronized UEs without valid uplink allocations for data transmission, in order to request such allocations.

Usually, a Physical Random Access Channel (PRACH) is provided for the UE to request access to the network. An access burst is used which contains a preamble with a specific sequence with good autocorrelation properties. The PRACH can be orthogonal to the traffic channels. For example, in GSM a special PRACH slot is defined.

Because multiple UEs can request access at the same time, collisions may occur between requesting UEs. Therefore LTE defines multiple RA preambles. A UE performing RA randomly picks a preamble out of a pool and transmits it. The preamble represents a random UE ID which is used by the eNodeB when granting the UE access to the network.

The eNodeB receiver can resolve RA attempts performed with different preambles and send a response message to each UE using the corresponding random UE IDs. In case that multiple UEs simultaneously use the same preamble a collision occurs and most likely the RA attempts are not successful since the eNodeB cannot distinguish between the two users with the same random UE ID. In LTE 64 preambles are provided in each cell. Preambles assigned to adjacent cells are typically different to insure that a RA in one cell does not trigger any RA events in a neighboring cell. Information that must be broadcasted is therefore the set of preambles that can be used for RA in the current cell.

The power used by the UE to transmit a RA preamble is typically calculated via open-loop power control. The UE measures the power on some downlink signals with known transmit power—e.g. reference signals or synchronization signals—and calculates the DL path loss. The power of the signals used to estimate the path must be known, therefore this information must be signaled to the UE, either via broadcasted in initial access or possibly via dedicated signaling in handover.

The path-loss is calculated as $$PL = P_{RS,RX} - P_{RS,TX}$$

where $P_{RS,RX}$ and $P_{RS,TX}$ are the received and transmitted power in dBm of the signal used for path-loss estimation, respectively.

In order to maintain a certain quality criteria for RA reception a minimum signal to noise (interference) ratio at the base station is required. The base station is aware of the present interference situation and can thus calculate the minimum required signal power $P_{0,RACH}$ the RA signal must have at the base station to fulfill the required quality criteria. This power level is also signaled to the UE. Using this power level together with the previous calculated path loss the UE now calculates $$P_{RACH} = \min\{P_{0,RACH} - PL + (N-1)\Delta_{RACH}, P_{max}\},$$

which is the transmit power needed to achieve the power level $P_{0,RACH}$ at the base station. This implies that the path loss—which has been calculated in the DL—is the same for the UL, which typically is not the case for FDD systems. Therefore open loop power control is a rather coarse mechanism. To overcome this limitation very often power ramping is applied. Here each subsequent attempt is performed with a by $\Delta_{RACH}$ increased transmission power. In above formula this is reflected by the term $(N-1)\cdot\Delta_{RACH}$, where N is the transmission attempt number.

The interference level at eNodeB and thus also the required target receive power $P_{0,RACH}$ depends on many factors and can vary over a wide range. Typically, $P_{0,RACH}$ is encoded and transmitted with a rather low number of bits—e.g. 4 bit—and spans around a range of 30 dB.

It is expected that LTE systems will be deployed in a wide range of scenarios, from pico cells to very large cells of up to 100 km and beyond. Since the RA is the first procedure performed by the UE to access the network it is of vital importance that random access works in all anticipated scenarios. If RA fails the UE cannot access the network.

In order to insure satisfactory RA performance the LTE standard defines multiple preamble formats. For the FDD mode four preambles axe defined, the TDD mode even specifies an additional fifth preamble. Some of these preambles are designed for larger cells and are thus longer than other preambles. The reception power and consequently the performance of the random access procedure are affected by RA configuration.

SUMMARY

There is an object of embodiments herein to achieve an efficient random access procedure.

Embodiments relate to a method in a first communication device within a communications network for designing a random access transmission power setting of the first communication device.

The first communication device receives data from a second communication device on a radio channel indicating a random access reception power. The first communication device then determines a desired random access reception power of the second communication device based on the received data and a parameter of random access configuration that influences a detection performance of the random access at the second communication device. Furthermore, the first communication device determines a random access transmission power to use based on the desired random access reception power and designs the random access transmission power setting of the first communication device in accordance with the determined random access transmission to use.

In order to perform the method a first communication device is provided. The first communication device comprises a receiving arrangement configured to receive data from a second communication device on a radio channel indicating a random access reception power to detect a random access transmission. The first communication device further comprises a control unit arranged to determine a desired random access reception power of the second communication device based on the received data and a parameter of random access configuration that influences a detection performance of the random access at the second communication device. The control unit is further arranged to determine a random access transmission power design setting based on the desired random access reception power.

In some embodiments, a method in a second communication device within a communications network for transmitting data over a radio channel is provided.

The second communications device determines a desired random access reception power from a first communication device such that the second communication device is enabled to detect a random access request from the first communication device using a parameter of random access configuration. The second communication device then determines data based on the desired random access reception power and a parameter of random access configuration and transmits the data over a radio channel to the first communication device.

In order to perform the method a second communication device is provided. The second communication device comprises a control unit arranged to determine a desired random access reception power from a first communication device such that the second communication device is enabled to detect a random access request from the first communication device. The control unit is further arranged to determine data based on the desired random access reception power and a parameter of random access configuration. The second communication device further comprises a transmitting arrangement configured to transmit the data over a radio channel to the first communication device.

Embodiments relate to methods and devices wherein the power setting of transmission takes the preamble format into account and the following random access procedure will be more efficient.

BRIEF DESCRIPTION OF THE DRAWINGS

Embodiments will now be described in more detail in relation to the enclosed drawings, in which.

DETAILED DESCRIPTION OF EMBODIMENTS

Figure 1:
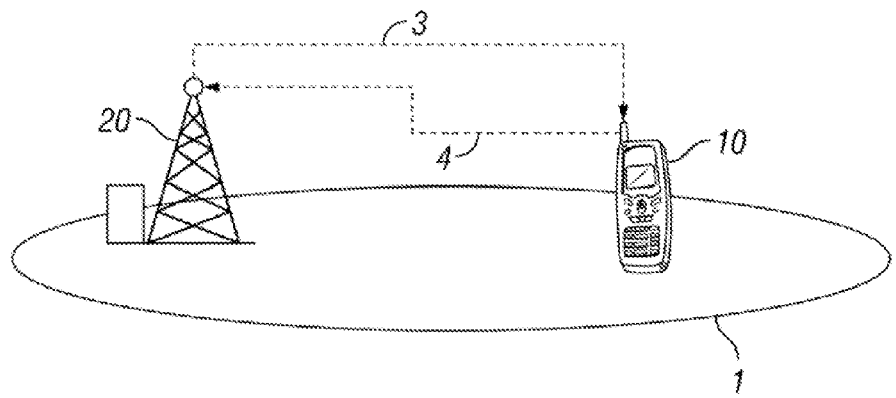
FIG. 1 shows a schematic overview of a communication device in a communications network.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The present invention is described below with reference to block diagrams and/or flowchart illustrations of methods, apparatus (systems) and/or computer program products according to embodiments of the invention. It is understood that several blocks of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

The present invention is described herein as employed in and with a communications device, also denoted a mobile device. In the context of the invention, the mobile device may e.g. be a mobile phone, a PDA (Personal Digital Assistant), base station or any other type of portable computer such as laptop computer.

A communications network may e.g. a cellular mobile communications network such as a GPRS network, a third generation WCDMA network, a LTE or the like. Given the rapid development in communications, there will of course also be future type wireless communications networks with which the present invention may be embodied.

A communication device comprises a user equipment, a base station, a controller node, a combination thereof, and/or the like.

A control unit may comprise a single processing unit, or a plurality of processing units. Similarly, a memory unit may comprise a single or a plurality of memory units, for example, internal and/or external memories.

In FIG. 1, a schematic overview of a communication device 10, such as a UE or the like in a communications network 1 is shown. At power-on or after a long standby time, the UE 10 is not synchronized in an uplink 4 to a base station 20. A first step in accessing the network is therefore to obtain synchronization to the network 1. This is usually done by the UE 10 by listening to signalling on a downlink 3 and to obtain from this signals downlink timing synchronization, an estimate of the frequency error, and also an estimate of the DL path loss.

The base station 20 signals an indication of a desired random access reception power to the UE 10 such that the base station 20 is enabled to detect a random access request from the UE 10.

The UE 10 determines random access transmission power to use based on a determined desired random access reception power of a second communication device. The desired random access reception power is being based on the received indication and a parameter of random access configuration that influences a detection performance of the random access at the second communication device.

For example, a parameter of random access configuration that influences a detection performance of the random access at the second communication device may be preamble format. With a longer preamble the eNodeB receiver can over a longer time accumulate the received signal power and thus can operate at signal to noise ratios lower than those required for shorter preambles.

The additional fifth preamble in TDD mode on the other hand is very short and therefore requires higher signal to noise ratios.

Even though with the existing solution $P_{0,RACH}$ can be chosen out of an approximately 30 dB wide interval the useful interval for a specific preamble is lower. For example, the short TDD preamble will not work with $P_{0,RACH}$ values from the lower end of the interval, whereas the long preambles will typically not require the highest $P_{0,RACH}$ values.

Different RA configurations require different signal powers at the eNodeB receiver to achieve the same detection performance and embodiments correct the transmission power to account for these different levels. This implies that the value range of required receive powers is better adapted to the individual preamble formats/basic cyclic shift values and/or the like than without correction. The cyclic shift value is a parameter for obtaining a cyclic shift unit of the root sequence, and subgroups may be ordered according to the cyclic shift value.

Figure 2:
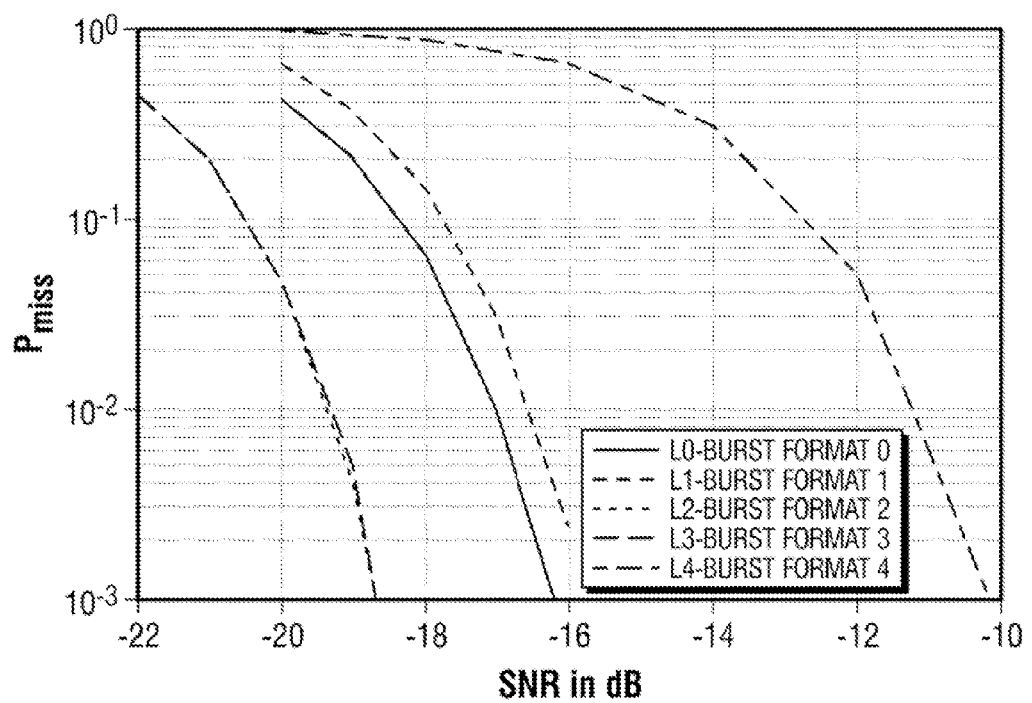
FIG. 2 shows the missed detection performance over signal to noise ratio for the five preamble formats defined in LTE.

In FIG. 2, the missed detection performance over signal to noise ratio is shown for the five preamble formats defined in LTE. Preamble formats 0,1 are illustrated with curves L0,L1. Preamble formats 2 and 3 are illustrated with curves L2, L3 and the short preamble format 4 is illustrated in curve L4. As can be seen preamble format 3 requires 9 dB less signal to noise ration than preamble format 4 to achieve a missed detection rate of 1e-3.

It is proposed to add to the formula describing the required transmit power a preamble format dependent correction term. This would shift the range of the desired receive power up or down to a power interval more appropriate for the used preamble.

Since the preamble format is anyway signaled to the UE, the UE knows which preamble to use and thus also knows the preamble dependent offset. For preamble formats 0 and 1 (normal long) this offset could be zero, for preamble formats 2 and 3 (long preambles) negative and for preamble format 4 (very short preamble) positive.

Another interpretation is that the bit pattern signaling $P_{0,RACH}$ is differently interpreted according to the preamble format.

A further possibility is to use different offsets for different purposes of the $P_{RACH}$ transmission. For example, a (time critical) $P_{RACH}$ transmission in the target cell after handover could use a positive offset as compared to other $P_{RACH}$ transmissions.

The formula used to calculate the RA transmit power $$P_{RACH} = \min\{P_{0,RACH} - PL + (N-1)\Delta_{RACH}, P_{max}\}$$

is now modified by an offset depending on the preamble format;

$$P_{RACH} = \min\{P_{0,RACH} - PL + (N-1)\Delta_{RACH} + \Delta_{Preamble}, P_{max}\}$$

A possible setting for ΔPreamble could be e.g. 0 dB, −3 dB, and 8 dB respectively for normal long preambles (formats 0, 1), long preambles (formats 2, 3) and short preamble (format 4). With a range of [−120, −90] dBm for $P_{0,RACH}$ the effective range for $P_{0,RACH}$−ΔPreamble becomes now [−120, −90], [−123, −93], and [−112, −82] for the normal, long, and short preamble formats, respectively. These intervals fit better to the typically needed signal power levels for the different preambles.

Another interpretation is to leave the original formula unchanged, i.e.

$$P_{RACH} = \min\{P_{0,RACH} - PL + (N-1)\Delta_{RACH}, P_{max}\},$$

but interpret the bit pattern signaling $P_{0,RACH}$ differently.

Table 1 shows a possible mapping of signaled $P_{0,RACH}$ index to actual $P_{0,RACH}$ value.

TABLE 1

The signalled $P_{0,RACH}$ index is mapped to different $P_{0,RACH}$ values depending on the preamble format. In this example, wise configuration preamble formats 0, 1 and 2, 3 have the same mapping.

| Signaled $P_{0,RACH}$ index | $P_{0,RACH}$ value for preamble formats 0 and 1 in dBm | $P_{0,RACH}$ value for preamble formats 2 and 3 in dBm | $P_{0,RACH}$ value for preamble format 4 in dBm |
|---|---|---|---|
| 0 | −120 | −123 | −112 |
| 1 | −118 | −121 | −110 |
| 2 | −116 | −119 | −108 |
| 3 | −114 | −117 | −106 |
| 14 | −92 | −95 | −84 |
| 15 | −90 | −93 | −82 |

In some embodiments the formula for the RA transmit power is modified with yet another correction term depending on the basic cyclic value NCS used to construct the RA preamble. Depending on the NCS value different thresholds are needed to maintain a certain false alarm rate. A higher threshold value improves false alarm rate but negatively impacts missed detections.

Here also the alternative interpretation is possible that signaled $P_{0,RACH}$ index is mapped to different $P_{0,RACH}$ values depending on NCS.

We also note that above invention applies even in the case if multiple preamble formats are permitted within a single cell. Depending which preamble a UE chooses to perform RA with it applies the appropriate correction term.

During the descriptions we assumed preambles of different length and based on the length they have different detection capabilities. However, even other differences between preambles may lead to different detection capabilities. Also in this case above invention is applicable.

The different RA preambles require different signal powers at the eNodeB receiver to achieve the same detection performance. Embodiments propose to add a correction term to the signaled value of the required RA receive power to account for these different levels. This implies that the value range of required receive powers is better adapted to the individual preambles than without correction.

Since the preamble format is anyway signaled to the UE no additional signaling is required.

Figure 3:
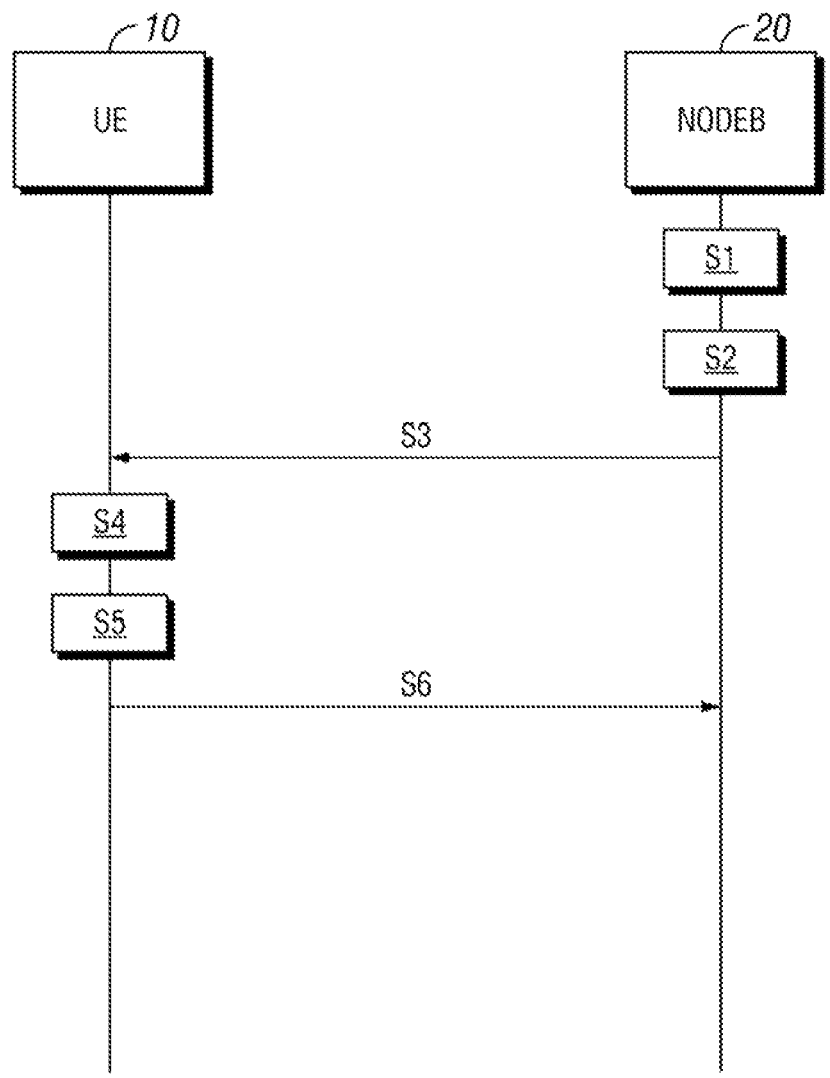
FIG. 3 shows a schematic combined method and signaling scheme.

Referring to FIG. 3, a schematic combined method and signaling scheme is shown. The signaling is performed between a first communication device 10 and a second communication device 20. In the illustrated example, the first communication device 10 comprises a user equipment and the second communication device 20 comprises a base station. A desired reception power of the base station is based on a parameter of random access configuration and in the illustrated example the parameter is a random access preamble format. However, it should be understood that such a parameter may instead comprises random access a basic cyclic shift value, a combination thereof and/or the like.

In step S1, the base station 20 calculates desired reception power Pdesired based on quality criteria, RA parameters, and/or the like.

In step S2, the base station 20 determines a pointer value indicating a power value based on the Pdesired and the random access preamble format that influences a detection performance of a random access operation of the user equipment at the base station.

In some embodiments, a Psignaled is a calculated value from Pdesired taken into account an offset value related to the random access preamble format. In the next step the base station looks up the value Psignaled in a table or a value closest to Psignaled. An index value is determined from the table corresponding to the matched/closest to value and this index value is used as the pointer value.

In some embodiments, the Pdesired is looked up in a table comprising a plurality of columns each corresponding to a value of the parameter of random access configuration. An index value is determined from the table corresponding to the Pdesired or a value closest to the Pdesired and this index value is used as the pointer value.

In step S3, the base station 20 transmits the pointer value to the user equipment 10 over a radio channel, for example, as a unicast, a broadcast, and/or a multicast.

In step S4, the user equipment 10 receives the pointer value, reads the pointer value and determines a random access transmission power to use.

In some embodiments, the user equipment 10 uses the pointer value in a table to find the Psignaled. Based on the Psignaled and the random access preamble format, which is known from previous signaling or determined by the user equipment based on the received signal carrying the pointer value, the Pdesired is determined. For example, an offset power value based on the preamble format is added to the Psignaled. Pdesired is then used to determine the random access transmission power to use.

In some embodiments, the user equipment 10 uses the pointer in a table of rows and columns together with the random access preamble format, pointer value defining the row and the random access preamble format defining the column, to determine Pdesired.

In step S5, the user equipment sets itself up in an operational mode arranged to use the determined random access transmission power.

In step S6, the user equipment performs a random access procedure and transmits random access data over a radio channel to the base station using the determined random access transmission power.

Figure 4:
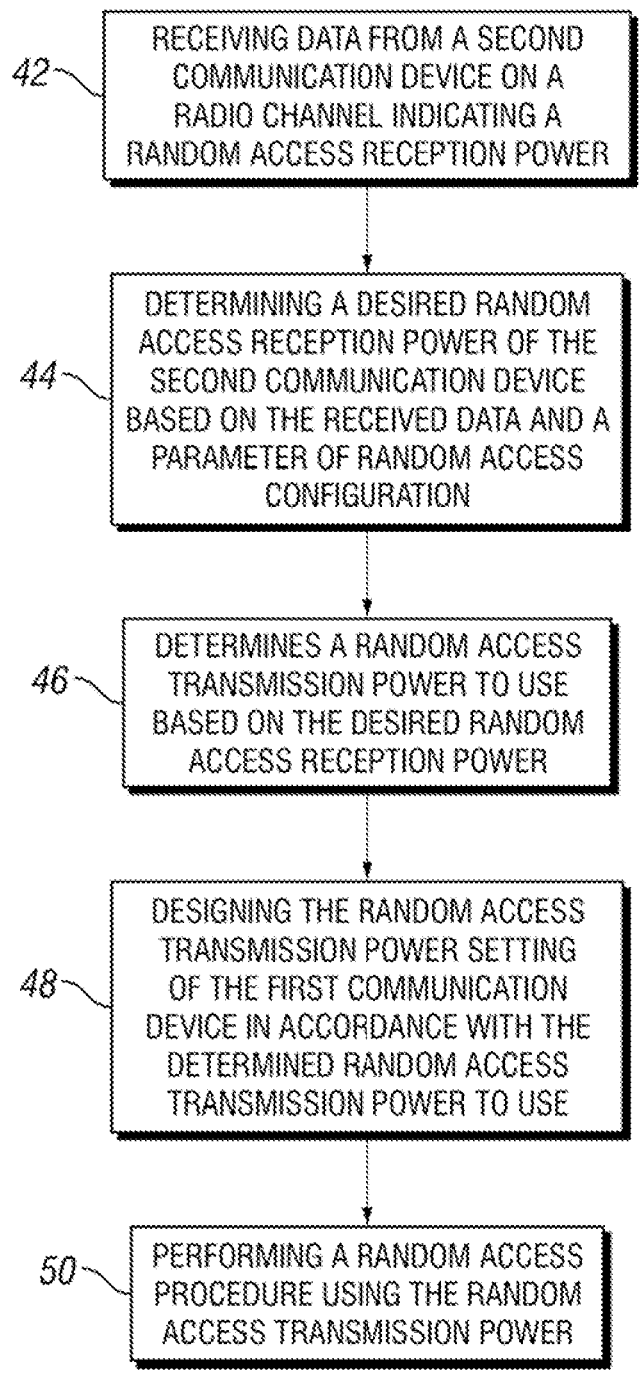
FIG. 4 shows a schematic flowchart of a method in a first communication device.

In FIG. 4, a schematic flow chart of a method in a first communications device is shown. The method is for designing the transmission power setting of the first communication device taken into account a parameter of random access configuration that influences a detection performance of the random access at the second communication device. The parameter may be a preamble format, a basic cyclic shift value, and/or the like.

In step 42, the first communications device receives data from a second communication device on a radio channel indicating a desired random access reception power. The data may be a pointer value to be used in a table or the like.

In step 44, the first communication device determines a desired random access reception power of the second communication device based on the received data and a parameter of random access configuration that influences a detection performance of the random access at the second communication device.

In some embodiments, the received data comprises a pointer value indicating a signalled random access reception power in a table of random access reception power and the step of determining the desired random access reception power is based on the signalled random access reception power and the parameter of random access configuration. The step of determining desired random access reception power may furthermore comprise to calculate the desired random access reception power by adding/subtracting an offset value to the signalled random access reception power wherein the offset value is based on the parameter of random access configuration.

In some alternative embodiments, the received data comprises a pointer value indicating a desired random access reception power in a table of desired random access reception power and the step of determining the desired random access reception power comprises to use the pointer value in a table together with the parameter of random access configurations. The table may, in some embodiments, comprise rows and columns, which are defined by pointer values and values of the parameter of random access configuration.

In step 46, the first communication device determines a random access transmission power to use based on the desired random access reception power.

In some embodiments, the step of determining desired random access transmission power to use further comprises to take into account power path loss between the first communication device and the second communication device.

In step 48, the first communication device sets itself up in an operational mode to use the determined random access transmission power.

In optional step 50, the first communication device performs a random access procedure using the determined random access transmission power.

In order to perform the method a first communication device is provided. The first communication device may be a user equipment, such as a mobile phone, a PDA, a laptop; a base station, a controller, a combination thereof, and/or the like.

Figure 5:
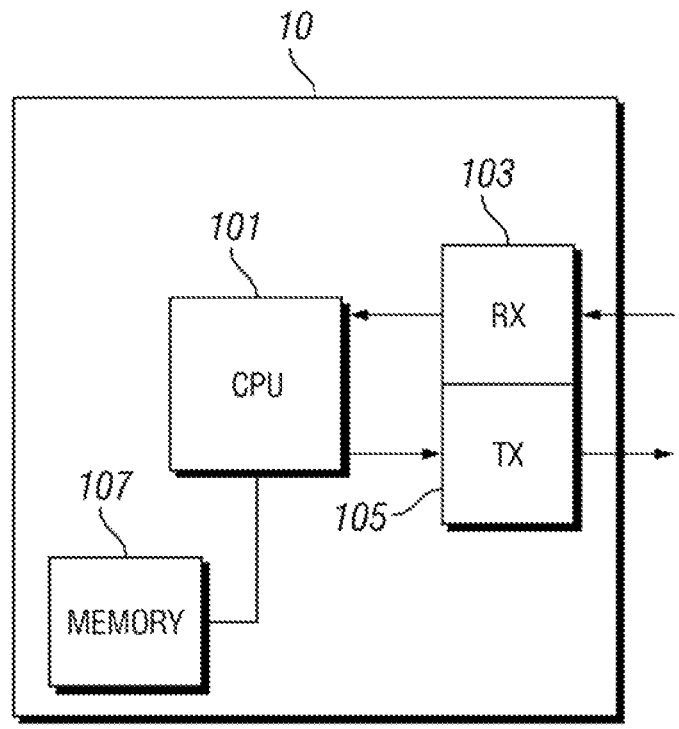
FIG. 5 shows a schematic overview of a first communication device.

In FIG. 5, a schematic overview of a first communication device illustrated as a user equipment is shown. The first communication device 10 is being arranged to communicate with a second communication device to set the transmission power setting design of the first communication device taken a parameter of random access configuration that influences a detection performance of the random access transmission at the second communication device into account. The parameter may be preamble format, basic cyclic shift value, and/or the like.

The first communication device 10 comprises a receiving arrangement 103 configured to receive a signal from a second communication device on a radio channel indicating a random access reception power to detect a random access transmission from the first communication device.

The first communication device 10 further comprises a control unit 101 arranged to determine a desired random access reception power of the second communication device based on the received data and the parameter of random access configuration that influences a detection performance of the random access transmission at the second communication device. The control unit 101 further being arranged to determine a random access transmission power design setting based on the desired random access reception power. In some embodiments, the control unit 101 is further arranged to take into account power path loss between the first communication device and the second communication device to determine random access transmission power.

The received data may, in some embodiments, comprise a pointer value arranged to indicate a signalled random access reception power in a table of random access reception power stored on a memory unit 107 in the first communication device. The control unit 101 then being arranged to determine the desired random access reception power based on the signalled random access reception power pointer and the parameter of random access configuration.

Furthermore, the control unit 101 may further be arranged to calculate the desired random access reception power by adding/subtracting an offset value to the signalled random access reception power wherein the offset value is based on the parameter of random access configuration.

In some alternative embodiments, the received data comprises a pointer value indicating a desired random access reception power in a table of desired random access reception power stored on the memory unit 107 in the first communication device. The control unit 101 then being arranged to use the pointer value in a table together with the parameter of random access configuration to determine the desired random access reception power. The table may comprise rows and columns, which are defined by pointer values and values of the parameter of random access configuration.

In some embodiments, the memory unit 107 has the data and tables stored thereon as well as applications arranged to be executed on the control unit 101 to perform the methods.

The control unit 101 may, in some embodiments, be arranged to perform a random access operation using the random access transmission power design and to transmit a random access request over a transmitting arrangement 105 of the first communication device to the second communication device or a different communication device.

The first communication device comprises a UE, a base station, a base station controller and/or the like.

Figure 6:
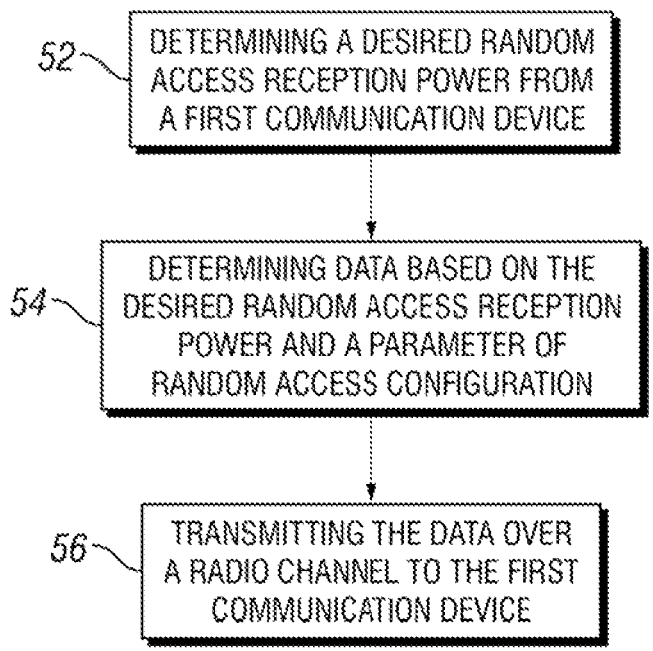
FIG. 6 shows a schematic flowchart of a method in a second communication device.

In FIG. 6, a schematic overview of a method in a second communication device for transmitting data over a radio channel is shown.

In step 52, the second communication device determines a desired random access reception power from a first communication device such that the second communication device is enabled to detect a random access request from the first communication device using a parameter of random access configuration that influences a detection performance of the random access at the second communication device.

In step 54, the second communication device determines data based on the desired random access reception power and the parameter of random access configuration. The parameter of random access configuration comprises a preamble format, a basic cyclic shift value of the random access configuration and/or the like.

In some embodiments, the second communication device further determines a signalled random access reception power based on the desired random access reception power and the parameter of random access configuration. A pointer value is then being retrieved from a table of signalled random access reception power based on the determined signalled random access reception power and then included into the data.

In some embodiments, the signalled random access reception power may be calculated from the desired random access reception power and an offset value wherein the offset value is based on the parameter of random access configuration.

In some embodiments, the second communication device further determines a pointer in a table of desired random access reception power. The pointer value is determined based on the determined desired random access reception power and the parameter of random access configuration. The data comprises the pointer value and the table may be a table of desired random access reception power comprising rows and columns, which are defined by pointer values and values of the parameter of random access configuration.

In step 56, the second communication device transmits the data over a radio channel to the first communication device.

In order to perform the method a second communication device is provided. The second communication device may comprise a base station, a controller, a user equipment, a combination thereof, and/or the like.

Figure 7:
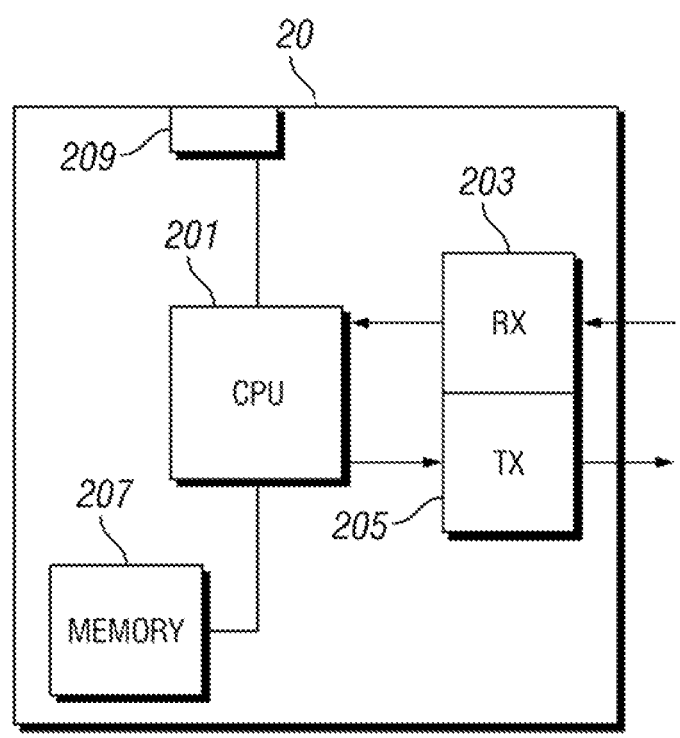
FIG. 7 shows a schematic overview of a second communication device.

In FIG. 7, a schematic overview of a second communication device 20 is shown.

The second communication device 20 comprises a control unit 201 arranged to determine a desired random access reception power from a first communication device such that the second communication device is enabled to detect a random access request from the first communication device.

The control unit 201 furthermore being arranged to determine data based on the desired random access reception power and a parameter of random access configuration that influences a detection performance of the random access at the second communication device. The parameter of random access configuration may comprise a preamble format, a basic cyclic shift value of the random access configuration and or the like.

In some embodiments, the control unit 201 is further arranged to determine a signalled random access reception power based on the desired random access reception power and the parameter of random access configuration stored on a memory unit 207. In addition, the control unit 201 is arranged to determine a pointer value based on the determined signalled random access reception power from a table of signalled random access reception power. The transmitted data then comprises the determined pointer value.

It should here be noted that the control unit 201 may then be arranged to calculate the desired signalled random access transmission reception power by using the desired random access reception power and an offset in the calculation, the offset being related to the parameter of random access configuration.

In some alternative embodiments, the transmitted data comprises a pointer value and the control unit 201 is arranged to determine the data by determining a pointer value in a table of desired random access reception power. The pointer value is arranged to be determined based on the determined desired random access reception power and the parameter of random access configuration. The table comprises rows and columns, which are defined by pointer values and values of the parameter of random access configuration.

The second communication device 20 comprises additionally a transmitting arrangement 205 configured to transmit the data over a radio channel to the first communication device.

The second communication device comprises a base station, a base station controller, a UE and/or the like.

In some embodiments, the memory unit 207 has the data and tablets stored thereon as well as applications arranged to be executed on the control unit 201 to perform the methods. The second communication device 20 may additionally comprise a network interface 209 to communicate with the communications network and a receiving arrangement 203 arranged to receive a random access request and/or the like.

In the drawings and specification, there have been disclosed exemplary embodiments of the invention. However, many variations and modifications can be made to these embodiments without substantially departing from the principles of the present invention. Accordingly, although specific terms are employed, they are used in a generic and descriptive sense only and not for purposes of limitation, the scope of the invention being defined by the following claims.

The invention claimed is:

1. A method for determining a random access transmission power of a first communication device in a communications network, the method comprising:

receiving, at the first communication device, data from a second communication device indicating a random access reception power;

determining a random access transmission power, $P_{RACH}$, to use based on the indicated random access reception power and a parameter of random access configuration, wherein the parameter comprises at least one of a preamble format and a basic cyclic shift value of a preamble, and wherein:

$$P_{RACH} = \min\{P_{0,RACH} - (P_{RS,RX} - P_{RS,TX}) + (N-1)\Delta_{RACH} + \Delta_{Preamble}, P_{max}\}, \text{ wherein:}$$

$P_{RACH}$ comprises the random access transmission power;

$P_{0,RACH}$ comprises the indicated random access reception power;

$P_{RS,RX}$ comprises the received power of the one or more reference signals;

$P_{RS,TX}$ comprises the transmitted power of the one or more reference signals;

$\Delta_{RACH}$ comprises a power ramping value;

N comprises a transmission attempt number;

$\Delta_{Preamble}$ comprises an offset value associated with the parameter of random access configuration; and $P_{max}$ comprises a maximum random access transmission power; and setting a random access transmission power of the first communication device in accordance with the determined random access transmission power, $P_{RACH}$.

2. The method of claim 1, wherein the received data comprises a pointer value for a table of random access reception powers, and wherein the method further comprises determining the indicated random access reception power from the table of random access reception powers using the pointer value and the parameter of random access configuration.

3. The method of claim 2, wherein the table comprises rows and columns that are associated with pointer values and values of the parameter of random access configuration.

4. The method of claim 1, further comprising transmitting a random access request using the random access transmission power.

5. The method of claim 1, wherein:
the parameter of random access configuration comprises a preamble format;
a first value for $\Delta_{Preamble}$ is associated with one or more preamble formats having a first preamble length;
a second value for $\Delta_{Preamble}$ is associated with one or more preamble formats having a second preamble length, wherein the second preamble length is shorter than the first preamble length, and wherein the second setting for $\Delta_{Preamble}$ is greater than the first setting for $\Delta_{Preamble}$.

6. A first communication device, comprising:
a receiver configured to receive data from a second communication device indicating a random access reception power;
a control unit configured to:
determining a random access transmission power, $P_{RACH}$, to use based on the indicated random access reception power and a parameter of random access configuration, wherein the parameter comprises at least one of a preamble format and a basic cyclic shift value of a preamble, and wherein:

$$P_{RACH} = \min\{P_{0,RACH} - (P_{RS,RX} - P_{RS,TX}) + (N-1)\Delta_{RACH} + \Delta_{Preamble}, P_{max}\}, \text{ wherein:}$$

$P_{RACH}$ comprises the random access transmission power;

$P_{0,RACH}$ comprises the indicated random access reception power;

$P_{RS,RX}$ comprises the received power of the one or more reference signals;

$P_{RS,TX}$ comprises the transmitted power of the one or more reference signals;

$\Delta_{RACH}$ comprises a power ramping value;

N comprises a transmission attempt number;

$\Delta_{Preamble}$ comprises an offset value associated with the parameter of random access configuration; and $P_{max}$ comprises a maximum random access transmission power; and set a random access transmission power of the first communication device in accordance with the determined random access transmission power, $P_{RACH}$.

7. The communication device of claim 6, wherein:
the received data comprises a pointer value for a table of random access reception powers; and
the control unit is further configured to determine the indicated random access reception power from the table of random access reception powers using the pointer value and the parameter of random access configuration.

8. The communication device of claim 7, wherein the table comprises rows and columns that are associated with pointer values and values of the parameter of random access configuration.

9. The communication device of claim 6, further comprising a transmitter configured to transmit a random access request using the random access transmission power.

10. The communication device of claim 6, wherein:
the parameter of random access configuration comprises a preamble format;
a first value for $\Delta_{Preamble}$ is associated with one or more preamble formats having a first preamble length;
a second value for $\Delta_{Preamble}$ is associated with one or more preamble formats having a second preamble length, wherein the second preamble length is shorter than the first preamble length, and wherein the second setting for $\Delta_{Preamble}$ is greater than the first setting for $\Delta_{Preamble}$.

11. A method for determining a random access transmission power of a first communication device in a communications network, the method comprising:
receiving, at the first communication device, data from a second communication device indicating a random access reception power;
determining a random access transmission power, $P_{RACH}$, to use based on the indicated random access reception power and a parameter of random access configuration, wherein the parameter comprises at least one of a preamble format and a basic cyclic shift value of a preamble, and wherein:

$$P_{RACH}=\min\{P_{0,RACH}-PL+(N-1)\Delta_{RACH}+\Delta_{Preamble}, P_{max}\}, \text{wherein:}$$

$P_{RACH}$ comprises the random access transmission power;
$P_{0,RACH}$ comprises the indicated random access reception power;
PL comprises a path loss value;
$\Delta_{RACH}$ comprises a power ramping value;
N comprises a transmission attempt number;
$\Delta_{Preamble}$ comprises an offset value associated with the parameter of random access configuration; and
$P_{max}$ comprises a maximum random access transmission power; and
transmitting a random access request using the determined random access transmission power, $P_{RACH}$.

12. The method of claim 11, wherein the path loss value, PL, is equal to a difference between a received power and a transmitted power for one or more reference signals having a known transmitted power.

13. The method of claim 12, wherein:

$$PL=P_{RS,RX}-P_{RS,TX};$$

$P_{RS,RX}$ comprises the received power of the one or more reference signals; and
$P_{RS,TX}$ comprises the transmitted power of the one or more reference signals.

14. A first communication device, comprising:
a receiver configured to receive data from a second communication device indicating a random access reception power;
a control unit configured to:
determining a random access transmission power, $P_{RACH}$, to use based on the indicated random access reception power and a parameter of random access configuration, wherein the parameter comprises at least one of a preamble format and a basic cyclic shift value of a preamble, and wherein:

$$P_{RACH}=\min\{P_{0,RACH}-(P_{RS,RX}-P_{RS,TX})+(N-1)\Delta_{RACH}+\Delta_{Preamble}, P_{max}\}, \text{wherein:}$$

$P_{RACH}$ comprises the random access transmission power;
$P_{0,RACH}$ comprises the indicated random access reception power;
PL comprises a path loss value;
$\Delta_{RACH}$ comprises a power ramping value;
N comprises a transmission attempt number;
$\Delta_{Preamble}$ comprises an offset value associated with the parameter of random access configuration; and
$P_{max}$ comprises a maximum random access transmission power; and
a transmitter configured to transmit a random access request using the determined random access transmission power, $P_{RACH}$.

15. The communication device of claim 14, wherein the path loss value, PL, is equal to a difference between a received power and a transmitted power for one or more reference signals having a known transmitted power.

16. The communication device of claim 15, wherein:

$$PL=P_{RS,RX}-P_{RS,TX};$$

$P_{RS,RX}$ comprises the received power of the one or more reference signals; and
$P_{RS,TX}$ comprises the transmitted power of the one or more reference signals.

* * * * *

UNITED STATES PATENT AND TRADEMARK OFFICE
CERTIFICATE OF CORRECTION

PATENT NO. : 8,611,262 B2
APPLICATION NO. : 13/488051
DATED : December 17, 2013
INVENTOR(S) : Baldemair et al.

Page 1 of 1

It is certified that error appears in the above-identified patent and that said Letters Patent is hereby corrected as shown below:

On the Title Page, at Item (75), under "Inventors", in Column 1, Line 2, delete "Furuskar," and insert -- Furuskär, --, therefor.

On the Title Page, at Item (56), under "OTHER PUBLICATIONS", in Column 2, Line 5, delete "Sevilla," and insert -- Seville, --, therefor.

In the Specification

In Column 2, Line 53, delete "axe" and insert -- are --, therefor.

In Column 6, Line 26, delete "ΔPreamble" and insert -- $\Delta_{Preamble}$ --, therefor.

In Column 6, Line 30, delete "P$_{0,RACH}$-ΔPreamble" and insert -- $P_{0,RACH}-\Delta_{Preamble}$ --, therefor.

In Column 9, Line 58, delete "tables" and insert -- table/s --, therefor.

In Column 11, Line 23, delete "tablets" and insert -- table/s --, therefor.

Signed and Sealed this
Nineteenth Day of August, 2014

Michelle K. Lee
*Deputy Director of the United States Patent and Trademark Office*